United States Patent

Edwards et al.

[11] Patent Number: 5,868,426
[45] Date of Patent: Feb. 9, 1999

[54] CROSS CAR STEERING COLUMN SUPPORT AND METHOD OF INSTALLATION

[75] Inventors: Bret A. Edwards, Rochester; Paul A. Ferranti, Macomb; Michael G. Dreer, Ortonville; Mark R. Fistler, Ray; William Dong, Dearborn; Ronald S. Lazarevich, Washington, all of Mich.

[73] Assignee: Chrysler Corporation, Auburn Hills, Mich.

[21] Appl. No.: 863,592

[22] Filed: May 27, 1997

[51] Int. Cl.⁶ .............................. B60K 37/00; B62D 1/16; B62D 25/08
[52] U.S. Cl. .............................. 280/779; 180/90; 296/70; 296/203.02
[58] Field of Search ...................................... 280/779, 780; 180/90; 296/70, 72, 203.02, 194

[56] References Cited

U.S. PATENT DOCUMENTS

| | | | |
|---|---|---|---|
| 1,283,638 | 11/1918 | Berg | 180/90 |
| 1,325,140 | 12/1919 | Carson | 180/90 |
| 2,072,655 | 3/1937 | Tjaarda | 180/90 |
| 5,387,023 | 2/1995 | Deneau | 296/72 |

FOREIGN PATENT DOCUMENTS 6-156315  6/1994  Japan ..................................... 280/779

*Primary Examiner*—Peter C. English
*Attorney, Agent, or Firm*—Lawrence J. Shurupoff

[57] ABSTRACT

A cross beam is mounted in a vehicle body between cowls on opposite sides of the vehicle body in a position to support a steering column. A bracket on one end of the beam has two slots which engage two locator studs on one of the cowls and provide increased body torsional stiffness. A second bracket is sleeved on the opposite end of the beam and has one slot engageable with a locator stud on the other cowl. The beam can be hung in the vehicle on these locator studs prior to driving fasteners which rigidly secure the brackets to the cowls. The second bracket may then be rigidly bolted to the beam.

7 Claims, 3 Drawing Sheets

CROSS CAR STEERING COLUMN SUPPORT AND METHOD OF INSTALLATION

FIELD OF INVENTION

This invention relates generally to steering column support structures and more particularly to a cross car beam assembly for supporting a steering column and method of installing the same.

BACKGROUND AND SUMMARY OF THE INVENTION

The steering column of an automotive vehicle must be securely mounted so that it does not vibrate. A vibrating steering column is very annoying to the driver. The steering column support assembly of this invention extends across the vehicle from cowl to cowl. A feature of the invention is its ability to accommodate variations in the distance from cowl to cowl while providing a robust torsional joint. Another feature is its ability to be installed quickly and accurately to minimize labor and tooling costs.

In accordance with the embodiment of the invention about to be described, the left end of the beam assembly is installed by hanging the beam on one and preferably two studs in the left cowl. The right end is hung on a stud in the right cowl. At this point, the beam is supported in the vehicle without any bolts having been driven. Bolts can now be installed to fully secure the assembly. The design is self-locating, eliminating the need for fixturing.

When the bolts on the left are driven, the beam will set itself against the left cowl. Any gap remaining at the right cowl, which may vary from vehicle to vehicle, is taken up by a slip joint to accommodate this gap. The right end of the beam has a bracket which slips over the beam and bolts to the right cowl. As the operator installs the bolts, the bracket slides along the beam until it sets against the cowl. The bracket is then secured to the beam in longitudinally adjusted position.

One object of this invention is to provide a steering column support structure having the foregoing features and capabilities.

Another object is to provide a steering column support structure which is composed of a relatively few simple parts, is rugged and durable in use, is easy to assemble, is self-locating, and has structural integrity, while optimizing cost and weight.

Other objects, features and advantages of the invention will become more apparent as the following description proceeds, especially when considered with the accompanying drawings and claims.

DETAILED DESCRIPTION OF THE PREFERRED EMBODIMENT

Figure 1:
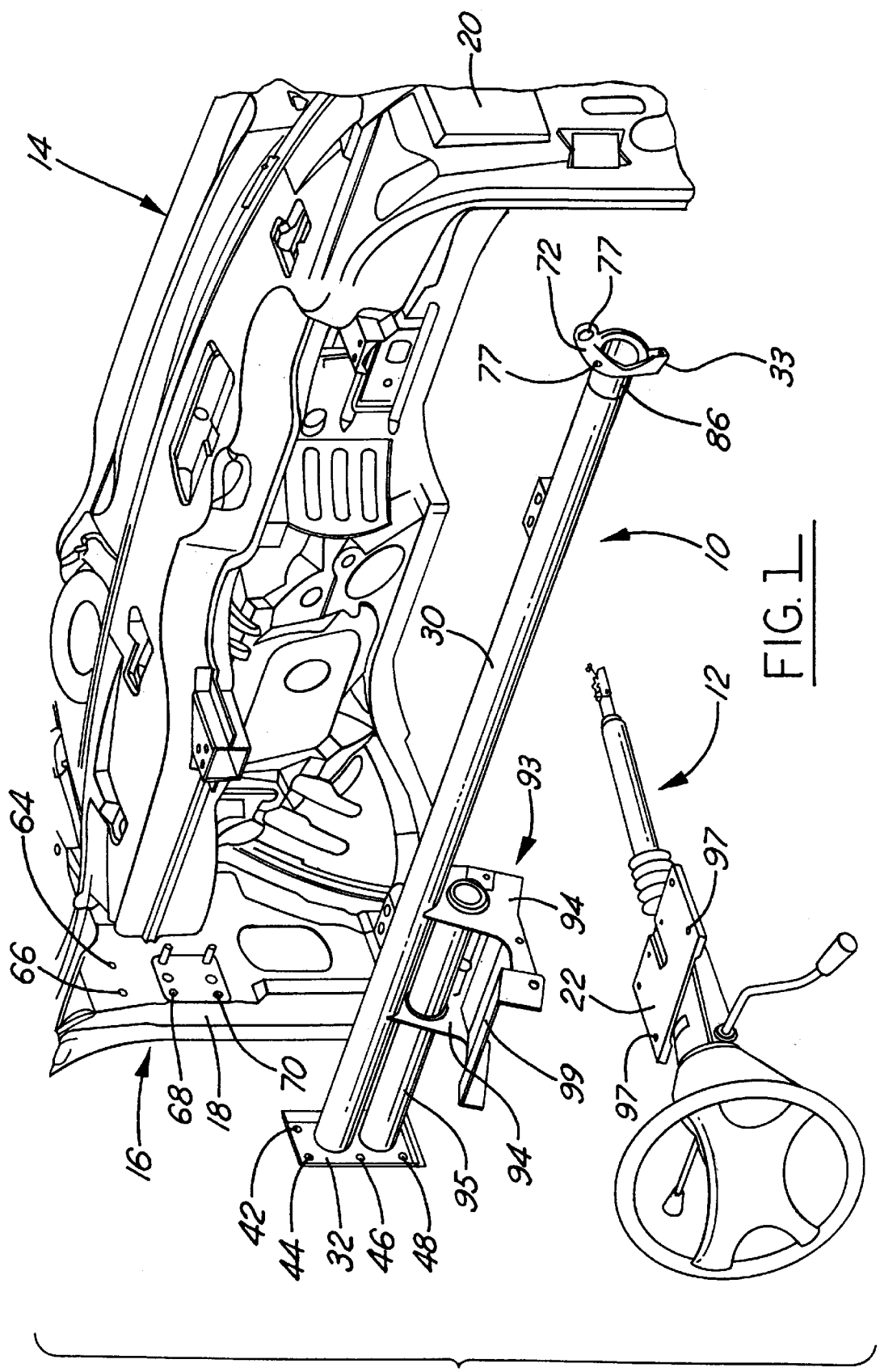
FIG. 1 is an exploded perspective view showing the cowls in the inside of the passenger compartment, the beam assembly of this invention separated from the cowls, and the steering column separated from the beam assembly.
Figure 2:
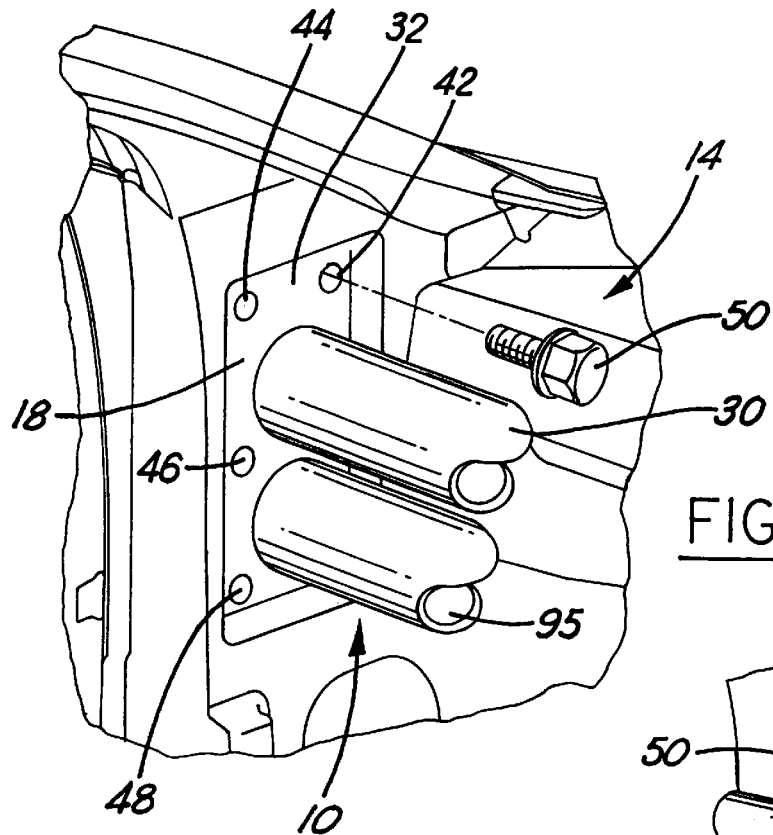
FIG. 2 is a fragmentary perspective view showing the left end of the beam assembly as it is being bolted to the left cowl.
Figure 3:
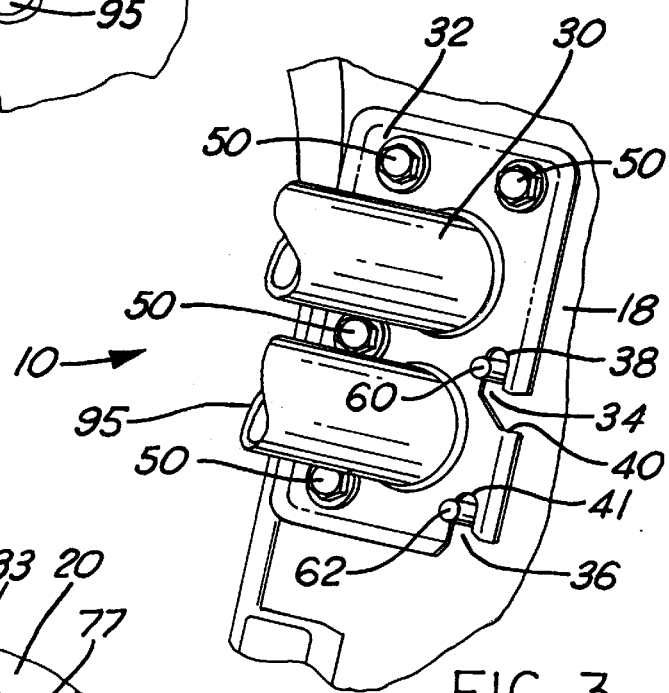
FIG. 3 is a fragmentary perspective view of the structure in FIG. 2 as seen from a different angle.
Figure 4:
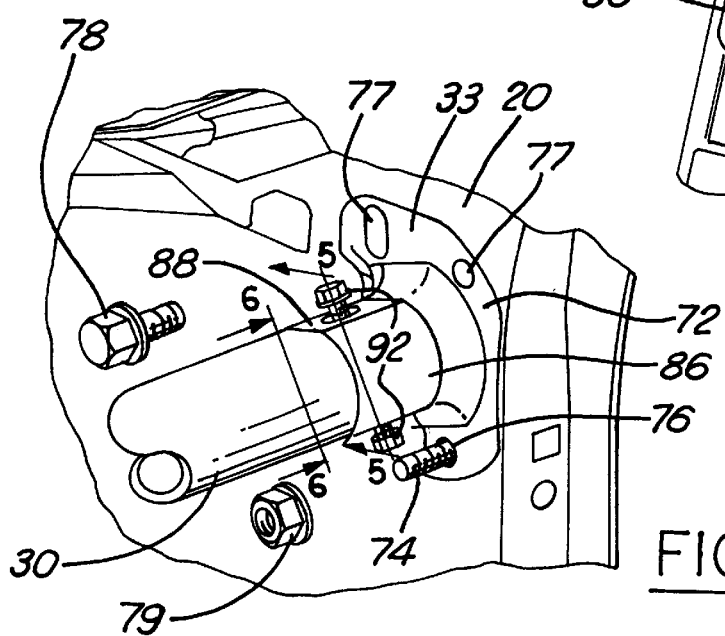
FIG. 4 is a fragmentary perspective view showing the installation of the beam assembly to the right cowl.
Figure 5:
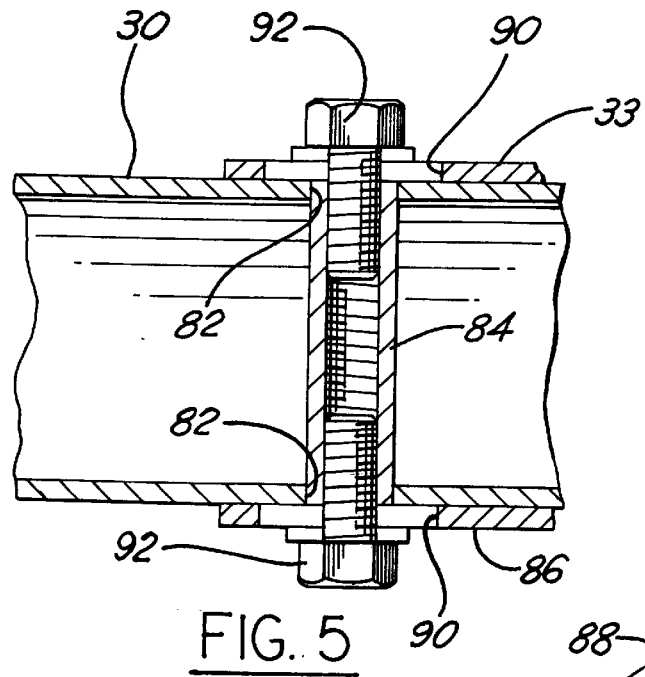
FIG. 5 is a sectional view taken on the line 5—5 in FIG. 4.
Figure 6:
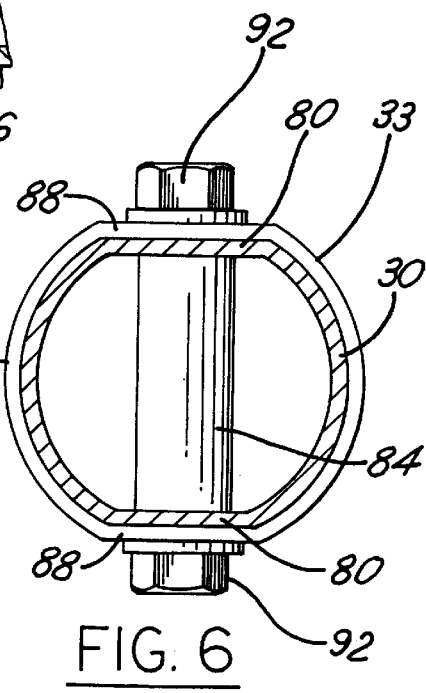
FIG. 6 is a sectional view taken on the line 6—6 in FIG. 4.
Figure 7:
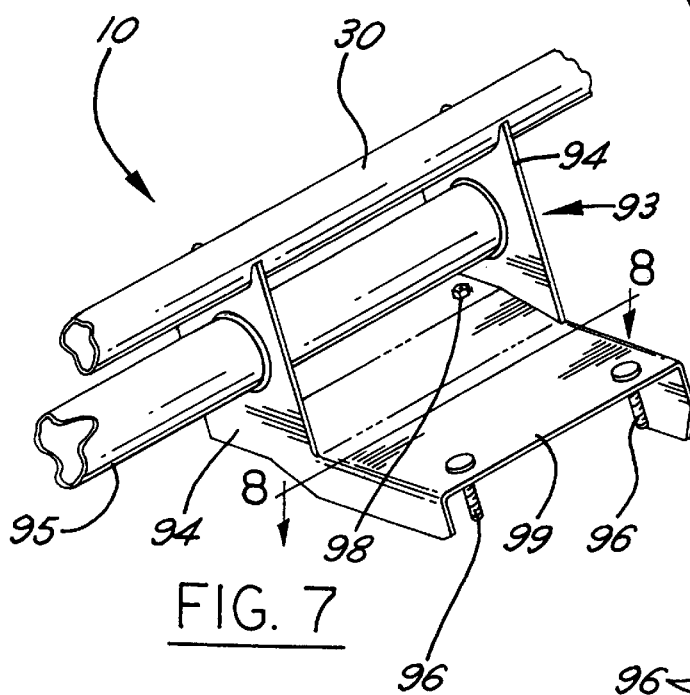
FIG. 7 is a perspective view showing the portion of the beam assembly to which the steering column is attached.
Figure 8:
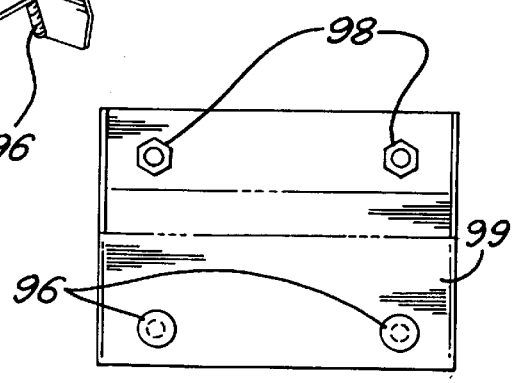
FIG. 8 is a view taken on the line 8—8 in FIG. 7.

Referring now more particularly to the drawings, and especially to FIG. 1, a cross beam assembly 10 is provided to mount a steering column 12 beneath an instrument panel 14 of an automotive vehicle body 16. The vehicle body 16 has a left cowl 18 on the driver side and a right cowl 20 on the passenger side. The cowls are generally vertical and face one another. The steering column 12 extends beneath the instrument panel 14 at an upward and rearward slope and has a mounting plate 22 secured to the top surface thereof.

The beam assembly 10 comprises an elongated tubular, cylindrical bar or beam 30 with a bracket 32 on the left end and a bracket 33 on the right end. The bracket 32 is in the form of a substantially flat plate disposed perpendicular to the beam and rigidly affixed to the beam. The bracket 32 has vertically spaced slots 34 and 36, the upper slot 34 having a vertically extending portion 38 which is closed at the top and which connects into a laterally extending entry portion 40 which opens through the side. The lower slot 36 is vertically elongated, closed at the top 41 and has an entry which opens through the lower corner portion of the plate. The bracket 32 has four holes 42, 44, 46 and 48 for receiving threaded fasteners 50.

The left cowl 18 has a pair of vertically spaced, horizontally inwardly extending parallel locator studs 60 and 62 which are spaced apart the same distance as the top closed end portions of the slots 34 and 36 in bracket 32. The left cowl 18 also has four holes 64, 66, 68 and 70 in the same pattern and arrangement as the holes 42–48 in the bracket 32 in order to receive the fasteners 50 when the fasteners are applied to secure the bracket 32 to the left cowl 18 as more fully described hereinafter.

The bracket 33 has a radially outwardly extending, annular flange 72 which is perpendicular to the beam 30. The flange 72 is adapted to lie flush against the inner surface of the right cowl 20 when attached thereto. The right cowl has a horizontal, threaded locator stud 74 projecting laterally inwardly and adapted to extend through a hole 76 in the flange 72 for locating purposes. The other holes 77 in the flange 72 are adapted to receive fasteners 78 for securing the bracket 33 to the right cowl by threading into holes (not shown) in the right cowl which are aligned with the holes 77 in the flange. A nut 79 threads on the locator stud 74 as an additional means of securing the bracket 33 to the right cowl.

The right end portion of the beam 30 is formed with diametrically opposite flats 80, with a hole 82 in each flat. The holes 82 are transversely aligned. An internally threaded tube 84 extends across the beam 30 and has its opposite ends rigidly secured in the holes 82. The bracket 33 has a tubular, generally cylindrical portion 86 which is longitudinally slidably fitted over the beam 30. The tubular portion 86 is formed with diametrically opposite flats 88 which engage over the flats 80 on the beam. The flats 80 and 88 provide and accomodate vehicle longitudinal variation while preventing the bracket 33 from rotating relative to beam 30. Each flat 88 is formed with a slot 90 which is elongated lengthwise of the beam 30 and overlies a hole 82 in the beam 30. Threaded fasteners 92 extend throughout the slots 90 and thread into tube 84 to clamp the bracket 33 in fixed, longitudinally adjusted position on the beam 30.

The beam assembly 10 has a steering column support structure 93 provided with a pair of side plates 94 which are rigidly secured to the beam 30. A second and shorter beam 95, parallel to the beam 30, has one end rigidly secured to the bracket 32. The other end extends through the plates 94 of the support structure 93 and is rigidly secured thereto. The support structure 93 has a plate portion 99 which overlies the mounting plate 22 on the steering column 12 and is rigidly secured thereto by any suitable means. In the present instance, threaded fasteners 96 adjacent the rear edge of the plate portion extend through holes 97 in the rear portion of the mounting plate 22 and nuts (not shown) are threaded on the fasteners. Nuts 98 welded to the front portion of the plate portion 99 receive threaded fasteners (not shown) extending up through the mounting plate 22 to effect a rigid attachment.

In order to carry out the method of the invention, the fasteners 92 are loosened to loosely retain the right bracket 33 on the beam 30. The left end of the beam assembly 10 is attached to the left cowl 18 by engaging the slots 34 and 36 of bracket 32 on the studs 60 and 62. With the bracket 32 hanging on the studs 60 and 62, the hole 76 of bracket 33 is engaged with the stud 74 on the right cowl 20. The bracket 33 is free to slide longitudinally on beam 30 to accomplish this. The beam assembly is thus hung in the vehicle prior to installing the attaching fasteners. Then the left bracket 32 is secured to the left cowl 18 by fasteners 50 and the right bracket 33 is secured to the right cowl 20 by fasteners 78 and nut 79. The left and right brackets could, if desired, be attached by the fasteners in the reverse sequence, or simultaneously if two persons are making the installation. The installer then must tighten loose assembled screws 92 on the right side. Thereafter, the mounting plate 22 of the steering column 12 is secured to the plate portion 99 of the support structure 93 of the beam assembly by the fasteners 96 and 98.

What is claimed is:

1. A cross beam assembly for supporting a steering column in an automotive vehicle body between first and second cowls on opposite sides of the vehicle body, comprising:

an elongated cross beam having a first end and a second end, a first bracket secured on the first end of said beam, means securing the first bracket to the first cowl, a second bracket longitudinally slidably mounted on the second end of said beam, means securing said second bracket to said second cowl, means for releasably securing said second bracket to the second end of said beam in longitudinally adjusted position, means for securing the steering column to said beam, first locator means for locating said first bracket with respect to said first cowl, and second locator means for locating said second bracket with respect to said second cowl, and wherein said first and second locator means comprise at least two spaced studs on said first cowl, at least two slots in said first bracket engageable with said respective two spaced studs, at least one stud on said second cowl, and at least one hole in said second bracket engageable with said at least one stud.

2. A cross beam assembly for supporting a steering column in an automotive vehicle body between first and second cowls on opposite sides of the vehicle body, comprising:

an elongated cross beam having a first end and a second end, a first bracket secured on the first end of said beam, means securing the first bracket to the first cowl, a second bracket longitudinally slidably mounted on the second end of said beam, means securing said second bracket to said second cowl, means for releasably securing said second bracket to the second end of said beam in longitudinally adjusted position, means for securing the steering column to said beam, and wherein said means releasably securing said second bracket to the second end of said beam comprises a tube having internally threaded ends secured within and extending transversely of said beam at the second end thereof, said beam having diametrically opposite holes exposing the ends of said tube, said second bracket having a tubular portion sleeved over the second end of said beam, said tubular portion having diametrically opposed, elongated slots extending lengthwise of said beam and overlying the respective ends of said tube, and fasteners extending through the diametrically opposite holes in said beam and said respective elongated slots and threaded into the ends of said tube to secure the second bracket to the second end of the beam.

3. A cross beam assembly as defined in claim 2, and further including first locator means for locating said first bracket with respect to said first cowl and second locator means for locating said second bracket with respect to said second cowl, wherein said first and second locator means comprise at least two spaced studs on said first cowl, at least two slots in said first bracket engageable with said respective two spaced studs, at least one stud on said second cowl, and at least one hole in said second bracket engageable with said at least one stud.

4. A cross beam assembly as defined in claim 3, wherein said beam has diametrically opposite first flats and said tubular portion of said second bracket has diametrically opposite second flats engaged over said first flats to prevent rotation of said second bracket relative to said beam, said holes in said beam being formed in said first flats and said slots in said tubular portion being formed in said second flats.

5. A method of mounting a cross beam in a vehicle body between first and second cowls on opposite sides of the vehicle body in a position to support a steering column, comprising providing a first bracket locator on said first cowl, providing a second bracket locator on said second cowl, mounting a first bracket in fixed position on a first end of said beam, longitudinally slidably mounting a second bracket on a second end of said beam, locating said first bracket on said first bracket locator, locating said second bracket on said second bracket locator, securing said first bracket to said first cowl, securing said second bracket to said second cowl, and securing said second bracket to said beam in longitudinally adjusted position and wherein said first and second bracket locators comprise at least two spaced-apart locator studs on said first cowl, at least two slots in said first bracket engageable with said respective two locator studs, at least one locator stud on said second cowl, and at least one hole in said second bracket engageable with said at least one stud.

6. A steering column cross beam assembly for supporting a steering column beneath an instrument panel in an automotive vehicle body between first and second cowls on opposite sides of the vehicle body, comprising:

an elongated cross beam having a first end and a second end, a first bracket rigidly affixed on the first end of said beam, means securing the first bracket to the first cowl, a second bracket longitudinally slidably mounted on the second end of said beam, means securing said second bracket to said second cowl, means for releasably securing said second bracket to the second end of said beam in longitudinally adjusted position, and means adjacent to said instrument panel for securing the steering column to said beam.

7. A cross beam assembly for supporting a steering column in an automotive vehicle body between first and second cowls on opposite sides of the vehicle body, comprising:

an elongated cross beam having a first end and a second end, a first bracket secured on the first end of said beam, mean curing the first bracket to the first cowl, a second bracket longitudinally slidably mounted on the second end of said beam, means securing said second bracket to said second cowl, means for releasably securing said second bracket to the second end of said beam in longitudinally adjusted position, means for securing the steering column to said beam, and a second beam extending between said first bracket and said means for securing the steering column to said beam.

* * * * *